Jan. 9, 1945.  W. W. JENKINS  2,366,908
CHUCKING BOOSTER FOR TURRET LATHES
Filed April 29, 1944  2 Sheets-Sheet 1

INVENTOR.
Willis W. Jenkins
BY
Edward R. Ramet
atty.

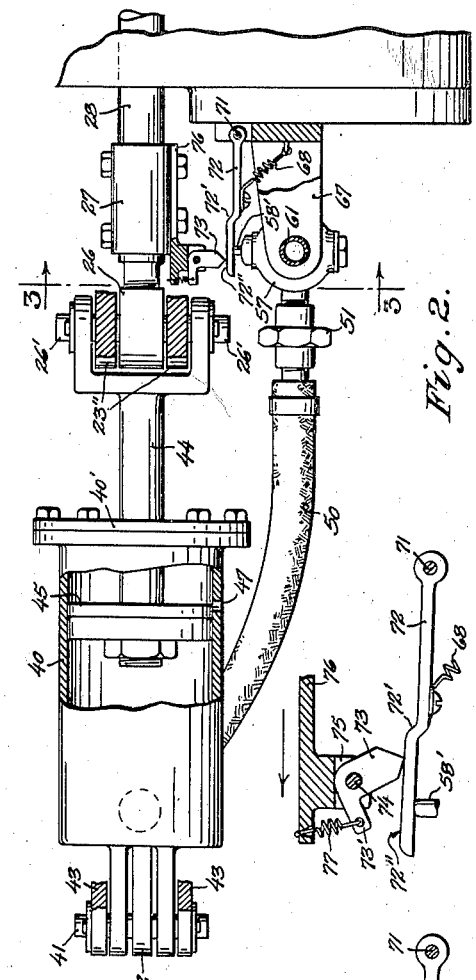

Patented Jan. 9, 1945

2,366,908

UNITED STATES PATENT OFFICE 2,366,908

CHUCKING BOOSTER FOR TURRET LATHES

Willis W. Jenkins, Seattle, Wash., assignor to Western Gear Works, Seattle, Wash., a corporation of Washington Application April 29, 1944, Serial No. 533,361

9 Claims. (Cl. 279—4)

This invention relates to turret lathes, and more especially to the feed and chuck mechanism thereof as it is employed to handle a long piece of bar stock in successively bringing the stock forward required distances for a given operation of machining each of a succession of bolts, studs, short shafts or the like, the stock being clamped against axial movement following each said advance.

As its general object, the invention aims to devise a power attachment for the lathe arranged and adapted to complement the standard hand-operated control of the machine's chuck and feed structure and which is so engineered as to act in harmony with the hand operation and pick up the load of a collet-closing action at that particular point when the operator reaches the hard spot—frequently termed the "hump"—of the stock-gripping movement. This is to say that the invention has for its general object to provide a structural assembly, powered by compressed air or other suitable instrumentality, which is normally inactive to the machine's stock-gripping spring collets but which, at a given point in the closing action, is brought into play to augment the hand force and thus promote efficiency and speed by reducing the energy required to be manually expended in accomplishing a closing of the collet over the bar.

With the foregoing end in view, the invention consists of a piston which is operatively interconnected with the hand-operated control lever of a turret lathe's feed and chuck structure, a cylinder for the piston, a source of pressure fluid, valved connections between the pressure source and the cylinder, and controls for these valves, all so arranged and adapted as to subject the piston to the pressure influence of the source only at a given point in the cyclic movement of the control lever.

The invention further consists in the novel construction and in the adaptation and combination of parts hereinafter described and claimed.

In the accompanying drawings:

Figure 1 is a fragmentary side elevational view of the stock-supporting end of a turret lathe showing typical feed and chuck mechanism, parts being broken away and shown in longitudinal vertical section, and illustrating my power attachment applied thereto. For maximum clarity in an understanding of the invention it is assumed that the controlling hand lever is being moved in the direction indicated by the arrow and has arrived at that point in its cyclic travel when the hard spot of the chucking action has been encountered.

Fig. 2 is a fragmentary horizontal section taken to a slightly enlarged scale on broken line 2—2 of Fig. 1.

Fig. 3 is a transverse vertical section on line 3—3 of Fig. 2.

Figure 1:
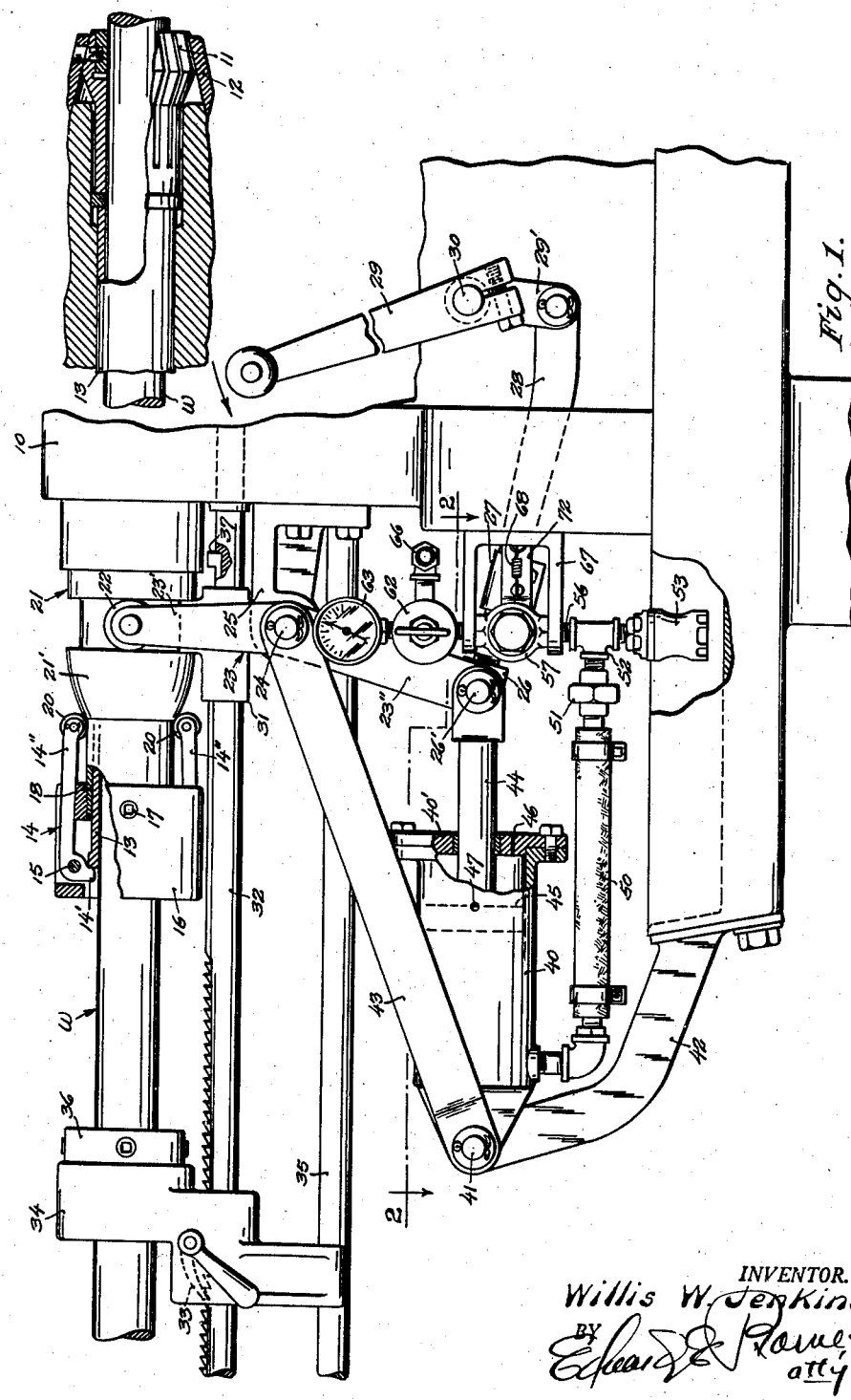

Fig. 4 is a fragmentary horizontal sectional view taken to an enlarged scale and detailing the pivoted wiping-dog which moves in unison with the hand lever of the machine and acts upon a finger-lever which in turn controls the air valve to govern the delivery of pressure air to the cylinder of my power attachment, the finger-lever being shown in much the same position as indicated in Fig. 2, namely depressed by the wiper to open the air valve as the wiper has been moved into contact therewith as the hand lever approaches the extreme of its backward or collet-closing movement.

Fig. 5 is a view similar to Fig. 4 excepting that the directive travel of the wiping-dog is shown reversed to portray the manner in which the same is swung about its pivotal axis to free the finger-lever of its depressive action and thus hold the air valve closed throughout the period of the hand lever's travel in the opposite or forward direction of its reciprocal movement.

Fig. 6 is a sectional view detailing the spring-closing "bleeder" valve which I employ in the pressure-air system to maintain a condition of atmospheric pressure within the cylinder during periods when the air valve is closed; and Fig. 7 is a sectional view detailing the air valve and employing dotted lines to indicate the associated finger-lever. It may be pointed out that the finger-lever is incorrectly shown as occupying a position disposed lengthwise to the line of the valve's ingress and egress pipes, distinguished from the relationship as it is illustrated in Figs. 1 through 3, inclusive, and which is done with the object of giving better comprehension of the association.

Clarity will perhaps be advanced by first describing the illustrated parts of the lathe proper, and considering the operation thereof—entirely by hand energy—as it has been heretofore performed, pointing out that the present invention in no wise disturbs either the mechanism of the machine or the manner of using.

The structure as it is shown in Fig. 1 typifies feed and chuck structure as it is customarily engineered into a turret lathe designed to handle long-bar work, the numeral 10 denoting the headstock and the letter W the long piece of bar stock from which the given work is to be produced, this said bar being clamped by spring collets to hold the same against axial movement and, as each machining operation is completed, freed from the grip of the collets and brought forward the required distance to expose a fresh length of bar, whereupon the collet fingers are again closed upon the same. The collets 11, which are in sets selected according to the diameter of the rod or bar used, are of a self-expanding nature closed by subjection to the cramping influence of a fixed chucking cap 12, being forced into the latter by forward thrust derived from a tubular spindle 13 occupying a position to the rear of the collet and in surrounding relation to the work-bar. Return movement of the said tube 13 occurs by the reacting elasticity of the collet fingers upon release of the responsible thrust energy.

To develop this thrust energy the machine employs toggle levers 14 presenting powering fingers 14' bearing against the tail end of the tube. These levers are pivoted as at 15 to a holder 16 which is in turn secured by screws 17 to a sleeve 18, the sleeve fitting over the tube and being held against endwise movement by the headstock. The actuating arms 14" of the toggle levers are terminally fitted with rollers 20 which, in the inactive position of the toggle levers, bear upon the surface of the sleeve, and operating upon such rollers to expand the arms 14" is a sliding cone 21'. This cone forms the nose of a spool 21, and engaging in the peripheral groove of the spool are roller-studs 22 carried by yoke-arms 23' produced upon one end of a rocking beam 23 fulcrumed, as at 24, to a knee-bracket 25, the knee-bracket being bolted to the frame of the lathe. The other end 23" of the rocking beam is also of furcate form and at its extremity finds swivel connection with the trunnion-pins 26' of an introduced block 26. Connecting by its rear end with block 26, through the medium of a clamping collar 27—accommodating endwise adjustment—is a link 28, and the forward end of this link engages the crank arm 29' of a hand lever 29 fulcrumed as at 30 to the lathe frame.

There is provided, occupying a position between the fork-arms of the yoke 23' and operatively interconnected with the spool for unitary axial movement therewith, a travelling block 31 receiving support from a reciprocally movable bar 32 and having lost-motion connection with the latter to impart sliding movement thereto, this bar being disposed below and parallel to the stock W and presenting a series of ratchet teeth which, in the forward travel of the bar, engage a pawl 33 (shown by dotted lines) carried by a work-shifting head 34, the head having a bushing therein accommodating the stock and receiving steadying support from a second bar 35 disposed subjacent to the ratchet-bar. The operation of shifting the stock obtains by engagement of the head 34 with a collar 36 screwed to the stock, pushing the latter along by the degree to which the ratchet-bar is moved forwardly. The lost-motion connection responsible for sliding the ratchet-bar in the forward movement of its reciprocatory action is indicated as comprising a key 37, and it is usual, to accomplish a return movement, to employ a set screw (not shown) working in a slot cut in the bar.

To cursorily trace the operation of the described feed and chuck mechanism, assuming a machining operation to have been completed and it is desired to bring a following length of the stock W forward the desired distance which will enable working, the operator pulls the hand lever 29 forwardly to responsively slide the spool toward the headstock and which retracts the cone 21' permitting the arms 14" to contract, the elasticity of the collet reacting to release the work-bar W and imparting slight endwise movement to the tube 13 returning the latter to its inactive position. This action takes place following movement of the hand lever through a comparatively small part of its total travel, and during this period the block 31 rides freely upon the ratchet bar 32. Continued forward swing of the hand lever further retracts the spool 21 and, with it, the travelling block 31 to bring the latter into engagement with the key 37 and the ratchet is then made operative upon the pawl to advance or feed the stock W forwardly throughout the remaining swing of the lever. A following backward swing of the hand lever with corresponding reversal of the spool's directive movement, and after a momentary free travel of the block 31 due to its lost-motion connection with the ratchet bar, picks up the latter and returns the bar, the pawl ratcheting freely during this return travel. As the hand lever nears the limit of its backward throw, the cone 21' is brought into engagement with the arms 14" and the start of a clamping action takes place, subjecting the operator to a comparatively heavy load as the toggle levers are initially brought into play and which slackens off as the rollers 20 are lifted off the sleeve 18 and onto the cone.

It is the purpose of the present invention to substantially relieve the operator of this transitory load, and now proceeding to describe the same, it will be seen that I employ an oscillating air cylinder 40 supported at its rear end by a swivel pin 41 carried upon the upper end of a bracket 42 boltably fixed to the lathe bed, additional support being brought down from the knee-bracket 25 by bracing struts 43, one such strut being applied at each side of the cylinder. The mounting is such that the cylinder lies in the approximate horizontal plane of and to the rear of the rocking beam's lower extremity, and saddling the latter and finding connection with the trunnion pins 26' is the forked end of a rod 44 connecting by its opposite end with a piston 45 received in the cylinder, this piston rod being journaled in a cylinder head 40' which is imperforate excepting for a small vent 46. This vent, limiting escape of air from in front of the piston as the latter nears the head 40', serves a cushioning office which will be understood in the course of the following description, and there is provided in the wall of the cylinder, and so placed as to be uncovered by the travel of the piston as the block 26—in its forward travel—reaches a point passing the hard spot of the collet-closing action, a blow-hole 47.

Indicated by 50 is a flexible hose connected to the rear end of the cylinder, and the other end of this hose attaches by a union 51 to the lateral outlet of a T 52. Such T is normally exposed to the atmosphere through a valve body 53 which connects with one of the T's two line-outlets, there being provided in this valve body a "bleeder" valve 54 opened under the influence of a spring 55. By its other line-outlet, and through a nipple 56, the T connects with the egress side of a valve body 57. The valve 58 for this latter said body is of the rapid-action type and is opened against the pressure of a spring 60 by depressive action imparted to a stem 58'. Attached by a nipple 61 to the ingress side of the valve body 57 is a pressure regulator 62 fitted with a pressure gauge 63, and supplying this regulator with pressure air from a suitable source is a supply pipe 66. The supply pipe is or may be fitted with an air cleaner and shut-off valve 64 and 65, respectively.

Reverting to said rapid-action valve, or which is to say the body therefor, the same is given a fixed support by means such as the U-bracket 67 to locate the exposed end of the stem 58' to one side of and at right angles to the path traversed by the clamping collar 27 of the link 28, and applied to loosely bear against this exposed end by the influence of a minor spring 68 is a finger-lever carried by a hinge-pin 71 for movement about a vertical axis. Offset outwardly beyond the shank 72 of the finger-lever and describing a shoulder-forming jog 72' at the point of juncture, the free end of said lever presents a "flat," denoted by 72", and functional to said flat and by engagement therewith acting to depress the stem 58' and open the valve 58 against the pressure of the spring 60 is a wiping-dog 73 movable in reciprocatory rectilineal travel with the link 28, the arrangement being one in which the dog wipes the finger-lever, or which is to say the flat thereof, in the forward direction of its reciprocatory travel while tracking freely over the flat in the return travel. More particularly described, said dog is fulcrumed, as at 74, within the slot 75 of a lug formed upon a plate 76 which is boltably fixed to the clamping collar 27, and is produced in the nature of a bell-crank to present a rearwardly directed toe element 73'. The toe element is urged by a spring 77 to normally foot upon the floor of the slot 75, and in this position locates the wiping arm in functional relation to the flat.

The operation of the wiper will be well understood by an inspection of Figs. 4 and 5. As the dog moves with the plate 76 in the forward direction indicated by arrow in Fig. 4, a wiping action takes place to depress stem 58' and hold valve 58 open during the period in which the dog traverses the flat, the finger-lever being freed and valve 58 closing as the dog proceeds beyond the shoulder 72'. A return movement, as indicated by the arrow of Fig. 5, trips the dog upon its contact with the shoulder, the dog being tilted into the illustrated position and being thereafter restored by spring 77 to its normal position as it clears the extremity of the finger-lever. The wiping action is timed to coincide with the travel of the wiping-dog during that period of its movement in which the spool 21 is passing over the hard spot of a collet-closing action.

Now considering the operation of the hand-lever 29 with my attachment applied to the lathe, and assuming that the hand lever is being moved in a backward direction, the greater part of the swing proceeds as heretofore—entirely manual—during which time the piston 45 freely follows the forward movement of the trunnion block 26 in that the air in front of the piston is enabled to readily escape through the blow-hole 47 and atmospheric air is fed into the cylinder proper through hose 50, being permitted to pass the valve 54 which is held open by the spring 55, this spring subjecting the said valve to a pressure sufficiently below that to which the pressure regulator 62 is set as to be readily overpowered by the force of air which is to be delivered through the air valve upon an opening of the latter. Continuing to move the hand lever to a point whereat the cone 21" is about to engage the toggle-levers, the wiping-dog will have been then brought into engagement with the finger-lever, and said air valve 58 opens as stem 58' is depressed. Closing the "bleeder" valve 54 as pressure air rushes through T 52 and hose 50 into the cylinder, piston 45 works upon the rocking beam to "boost" the spool 21 over the hard spot and, substantially coinciding as to time, the synchronized closing of the valve 58 and opening of the blow-hole 47, as the wiping-dog clears the jog 72' and the piston advances beyond said blow-hole, isolates the cylinder from the pressure source and drops the pressure within the cylinder, the piston being cushioned in its slight further movement by the air trapped—other than for minor escape through vent 46—between the piston and the cylinder head 40'. The bleeder valve 54 will have opened simultaneously with the "blowing" of the cylinder, enabling the piston to be moved freely in its return travel as it becomes again necessary to release the collet and, by the action of the ratchet-bar, bring a fresh length of the stock W into position for machining.

Departures from the embodiment of the invention which I have elected to illustrate will suggest themselves, and no limitations are to be implied from the foregoing description having express reference thereto, it being my intention that all forms of construction and variations in detail coming within the scope of the hereto annexed claims are to be considered as comprehended by the invention.

What I claim is:

1. In a long-bar turret lathe having a reciprocally movable and hand-energized control member, and providing feed and chuck mechanism functional to the work-bar and connected for responsive action to the control member such that the chucking action takes place only as the control member approaches the end limit of travel in one direction of reciprocation and the freeing of the work-bar is effectuated by movement in the opposite direction through a corresponding span of travel, said chuck mechanism being characterized in that the same develops a hard spot transmitted to the control member in the initial period of the latter's said chucking travel, power devices for relieving the operator of said encountered load of the hard spot and comprising, in combination with the said mechanism and with the control member: a piston coupled to the control member for movement relatively in unison therewith; a cylinder for the piston having a blow-hole in its wall uncovered by the piston as the responsible control member, in its chucking movement, advances beyond said hard spot; a source of fluid pressure; a fluid-flow pipe from the pressure source to the cylinder leading into the latter at the cylinder's rear end considered as to the directive travel of the piston under a chucking movement of the control member; a normally closed valve introduced in said fluid-flow pipe; means normally inactive to the valve, made responsive to the movement of the control member, and operating upon the valve to open the latter only as the control member traverses said hard spot of a chucking action; a second valve introduced in said fluid-flow pipe to occupy a position between the first-named valve and the cylinder and acting, when open, to relieve the pressure within the fluid-flow pipe; and a spring overpowered by the pressure of the source and acting upon the second-named valve to urge the latter into its open position.

2. In a long-bar turret lathe having a reciprocally movable and hand-energized control member, and providing feed and chuck mechanism functional to the work-bar and connected for responsive action to the control member such that the chucking action takes place only as the control member approaches the end limit of travel in one direction of reciprocation and the freeing of the work-bar is effectuated by movement in the opposite direction through a corresponding span of travel, said chuck mechanism being characterized in that the same develops a hard spot transmitted to the control member in the initial period of the latter's said chucking travel, power devices for relieving the operator of said encountered load of the hard spot and comprising, in combination with the said mechanism and with the control member: a piston coupled to the control member for movement relatively in unison therewith; a cylinder for the piston having a sidewall port exposed to the atmosphere and uncovered by the piston at that point in the chucking movement of the control member when the latter clears the hard spot; a source of pressure air; an air pipe from the pressure source to the cylinder for supplying air behind the piston as the latter moves in a chucking direction with the control member; a normally closed valve introduced in said air pipe; means normally inactive to the valve, made responsive to the movement of the control member, and operating upon the valve to open the latter only as the control member traverses said hard spot of a chucking action; a second valve introduced in said air pipe to occupy a position between the first-named valve and the cylinder and giving connection, when open, to the atmosphere; and a spring overpowered by the pressure of the source and acting upon the second-named valve to urge the latter into its open position.

3. In a long-bar turret lathe having a reciprocally movable and hand-energized control member, and providing feed and chuck mechanism functional to the work-bar and connected for responsive action to the control member such that the chucking action takes place only as the control member approaches the end limit of travel in one direction of reciprocation and the freeing of the work-bar is effectuated by movement in the opposite direction through a corresponding span of travel, said chuck mechanism being characterized in that the same develops a hard spot transmitted to the control member in a stage of the latter's said chucking travel, power devices for relieving the operator of said encountered load of the hard spot and comprising, in combination with the said mechanism and with the control member: a piston coupled to the control member for movement relatively in unison therewith; a cylinder for the piston; a source of pressure air; an air pipe from the pressure source to the cylinder arranged to supply air behind the piston as the latter moves in a chucking direction with the control member; a normally closed valve introduced in the air pipe; means normally inactive to the valve, made responsive to the movement of the control member, and operating upon the valve to open the latter only as the control member moves through its said chucking stage; means for "blowing" the pressure air from the cylinder following a closing of said valve; a second valve introduced in said air pipe to occupy a position between the first-named valve and the cylinder and giving connection, when open, to the atmosphere; and means overpowered by the pressure of the source and acting upon the second-named valve to yieldingly urge the latter into its open position.

4. In a long-bar turret lathe having a reciprocally movable and hand-energized control member, and providing feed and chuck mechanism functional to the work-bar and connected for responsive action to the control member such that the chuck mechanism is freed from the work-bar and the latter brought forward in the lathe by movement of the control member through successive stages of its travel in one direction of reciprocation, and the chuck mechanism again made active to grip the work-bar by movement of the control member through that part of its return travel reversely coinciding with the work-freeing stage, power devices for relieving the operator of the starting load of a chucking operation and comprising, in combination with the said mechanism and with the control member: a piston operatively interconnected with the control member for movement relatively in unison therewith; a cylinder for the piston; a source of fluid pressure; a fluid-flow pipe from the source to the cylinder arranged to supply pressure fluid behind the piston considering the latter as moving with the control member toward its chucking stage; a normally closed valve for the fluid-flow pipe; means associated with the valve, governed automatically by the movement of the control member, and operating to open said valve throughout a partial period only of the control member's said return travel, said period including the start of a chucking stage and terminating short of the return limit of travel; and means acting to maintain a low-pressure condition within said cylinder during normal periods when the valve is closed.

5. In combination with a reciprocally movable member adapted to be shifted by hand energy, mechanism acting to augment the hand energy for powering the shiftable member in but one direction of its reciprocatory travel and only such as will carry the member over a given span of movement terminating short of the member's full stroke, comprising a piston operatively interconnected with the member for movement relatively in unison therewith; a cylinder for the piston providing a blow-hole in its wall uncovered by the piston as the latter occupies a position coinciding with the location of the shiftable member as the member clears said given span; a source of fluid pressure; a fluid-flow pipe from the source to the cylinder connecting with the cylinder to the rear of the piston when considering the piston's directive travel as the shiftable member moves through said given span; a normally closed valve for the fluid-flow pipe; means associated with the valve, governed automatically by the movement of the shiftable member, and operating to open said valve only through the period when the shiftable member is traversing said given span; a second valve introduced in said fluid-flow pipe to occupy a position between the first-named valve and the cylinder and acting, when open, to relieve the pressure within the fluid-flow pipe; and means overpowered by the pressure of the source and acting upon the second-named valve to yieldingly urge the latter into its open position.

6. In combination with a reciprocally movable member adapted to be shifted by hand energy, mechanism acting to augment the hand energy for powering the shiftable member in but one direction of its reciprocatory travel and only such as will carry the member over a given span of movement terminating short of the member's full stroke, comprising a piston operatively interconnected with the member for movement relatively in unison therewith; a cylinder for the piston; a source of pressure air; an air pipe from the source to the cylinder connecting with the cylinder to the rear of the piston when considering the piston's directive travel as the shiftable member moves in said one direction of its reciprocatory travel; a valve for the air pipe; means responding to the movement of the shiftable member and acting to open said valve during traversal by said member of said given span while maintaining the valve in a closed position throughout the remaining reciprocatory travel of the member; a second valve introduced in said air pipe between the first-named valve and the cylinder giving access, when open, to the atmosphere; means overpowered by the pressure of the source and acting upon the second-named valve to yieldingly urge the latter into its open position; and means independent of said last-named valve functioning to relieve the pressure within the cylinder at a point in the travel of the piston approximately coinciding with the closing of said first-named valve as the shiftable member clears said given span.

7. In combination with a reciprocally movable member adapted to be shifted by an energizing force of comparatively low intensity, mechanism acting to augment said force for boosting the shiftable member over a given span of movement in one direction only of its reciprocatory travel and comprising: a piston operatively interconnected with the member for movement relatively in unison therewith; a cylinder for the piston; a source of pressure air; an air pipe from the source to the cylinder connecting with the cylinder to the rear of the piston when considering the piston's directive travel as the shiftable member moves in said one direction of its reciprocatory action; a valve introduced in said air pipe and normally occupying a closed position to isolate the source from the cylinder; means responding to the movement of the shiftable member and acting to open said valve only as the member traverses said given span; a connection from the air pipe to the atmosphere introduced between the valve and the cylinder; a valve for said last-named connection closed by subjection to the pressure of the source; means having a force characteristic less than the pressure of the source and acting upon the last-named valve to yieldingly urge the latter into its open position; and means independent of said connection to the atmosphere functioning to relieve the pressure within the cylinder at a point in the travel of the piston approximately coinciding with the closing of said first-named valve as the shiftable member clears said given span, the means last recited comprising a blow-hole provided in the wall of the cylinder.

8. In combination with a reciprocally movable member adapted to be shifted by an energizing force of comparatively low intensity, mechanism acting to augment said force for boosting the shiftable member over a given span of movement in one direction only of its reciprocatory travel and comprising: a piston operatively interconnected with the member for movement relatively in unison therewith; a cylinder for the piston; a source of pressure air; an air pipe leading from the source to the cylinder and connecting with the cylinder to the rear of the piston when considering the piston's directive travel as the shiftable member moves in said one direction of its reciprocatory action; a valve introduced in said air pipe and normally occupying a closed position to isolate the source from the cylinder; means responding to the movement of the shiftable member and operatively connected with the valve to open the latter only as the member traverses said given span; a connection from the air pipe to the atmosphere introduced between the valve and the cylinder; a valve for said last-named connection closed by subjection to the pressure of the source; means having a force characteristic less than the pressure of the source and acting upon the last-named valve to yieldingly urge the latter into its open position; and means independent of said connection to the atmosphere functioning to exhaust pressure air from within the air pipe and the cylinder as the shiftable member clears said given span, thus to drop the pressure within the air pipe below the force characteristic of the last-recited valve-opening means to enable the latter to exercise its influence to open the related valve.

9. In a long-bar turret lathe having a reciprocally movable and hand-energized control member, and providing a chuck and a ratchet feed functional to the work-bar and each connected for responsive action to the control member such that the chuck mechanism is freed from the work-bar and the ratchet feed made operative to bring the work-bar forward as the control member moves through successive stages in one stroke of its reciprocation, and the feed mechanism caused to freely ratchet and the chuck made active to again grip the work-bar as the control member moves through its return stroke of reciprocation, said chuck being characterized in that the same transmits a hard spot to the control member upon the initiation of a chucking action, power devices operative upon the control member for boosting the latter over said transmitted hard spot and comprising, in combination with the control member and with the responding feed and chuck mechanism: a source of pressure air; an air cylinder closed at both ends, having connection by one of its ends to the pressure source, and having its other end vented to the atmosphere; a piston received in the cylinder, operatively connected for unitary movement with the control member, and acting by admission of pressure air to the cylinder to power the control member over said hard spot, said cylinder providing a wall port giving access to the atmosphere and located in proximity of but spaced from the vented end of the cylinder and uncovered by the travel of the piston as the responding control member clears said hard spot; a normally closed valve introduced in said air connection acting, when closed, to isolate the source from the cylinder; means made responsive to the movement of the control member and acting upon the valve to open the latter only as the control member traverses said hard spot; an outlet from the air connection to the atmosphere located between said valve and the cylinder; a valve for said outlet closed by subjection to the pressure of the source; and means having a force characteristic less than the pressure of the source and acting upon the last-named valve to influence the same into its open position.

WILLIS W. JENKINS.